United States Patent
Wang et al.

(10) Patent No.: US 11,327,231 B2
(45) Date of Patent: May 10, 2022

(54) FLEXIBLE SPLICE PROTECTOR ASSEMBLY AND METHOD FOR PREPARING SAME

(71) Applicant: CommScope Technologies LLC, Hickory, NC (US)

(72) Inventors: Chi Ming Wang, Glen Ellyn, IL (US); Ibrahim M. Elnatour, Orland Park, IL (US)

(73) Assignee: CommScope Technologies LLC, Hickory, NC (US)

( * ) Notice: Subject to any disclaimer, the term of this patent is extended or adjusted under 35 U.S.C. 154(b) by 22 days.

(21) Appl. No.: 17/089,385

(22) Filed: Nov. 4, 2020

(65) Prior Publication Data

US 2021/0173146 A1    Jun. 10, 2021

Related U.S. Application Data

(60) Provisional application No. 62/944,125, filed on Dec. 5, 2019.

(51) Int. Cl.
*G02B 6/255* (2006.01)
*G02B 6/44* (2006.01)

(52) U.S. Cl.
CPC ......... *G02B 6/2557* (2013.01); *G02B 6/2553* (2013.01); *G02B 6/4476* (2013.01)

(58) Field of Classification Search
CPC .. G02B 6/2557; G02B 6/2553; G02B 6/4476; G02B 6/2558
See application file for complete search history.

(56) References Cited

U.S. PATENT DOCUMENTS

| 4,648,168 | A | * | 3/1987 | Nolf | G02B 6/2558 |
| | | | | | 29/447 |
| 4,927,227 | A | * | 5/1990 | Bensel, III | G02B 6/4439 |
| | | | | | 385/135 |

(Continued)

OTHER PUBLICATIONS

"International Search Report and Written Opinion corresponding to International Application No. PCT/US2020/059084 dated Feb. 26, 2021".

*Primary Examiner* — Andrew Jordan
(74) *Attorney, Agent, or Firm* — Myers Bigel, P.A.

(57) ABSTRACT

An assembly includes: first and second fiber optic cables, each of the first and second fiber optic cables including an exposed portion of an optical fiber and an overlying jacket, wherein the optical fiber of the first fiber optic cable is fusion spliced to the optical fiber of the second fiber optic cable to form a splice area; a splice protector that surrounds the splice area of the first and second fiber optic cables; a flexible tube that encircles the splice protector, the exposed portions of the first and second fiber optic cables, and end portions of the jackets of the first and second fiber optic cables, wherein the splice protector, the exposed portions of optical fibers of the first and second fiber optic cables reside in a lumen of the flexible tube; first and second adhesive barriers positioned between an inner surface of the flexible tube and the end portions of the first and second fiber optic cables, respectively; and an outer sleeve that circumferentially overlies the flexible tube and portions of the jackets of the first and second fiber optic cables.

20 Claims, 2 Drawing Sheets

(56) References Cited

U.S. PATENT DOCUMENTS

| | | | | |
|---|---|---|---|---|
| 5,481,639 | A | * | 1/1996 | Cobb .................. G02B 6/4442 385/135 |
| 5,894,536 | A | | 4/1999 | Rifkin et al. |
| D876,367 | S | * | 2/2020 | Wang ......................... D13/147 |
| 10,976,504 | B2 | * | 4/2021 | Wang .................. G02B 6/3877 |
| 2009/0324177 | A1 | | 12/2009 | Qian et al. |
| 2015/0160415 | A1 | | 6/2015 | Lloyd et al. |
| 2015/0185419 | A1 | * | 7/2015 | Kawanishi ............. H05B 1/023 385/96 |
| 2017/0075067 | A1 | | 3/2017 | Filipowicz et al. |
| 2018/0156975 | A1 | | 6/2018 | Seri et al. |
| 2021/0116661 | A1 | * | 4/2021 | Wang .................. G02B 6/4403 |
| 2021/0157055 | A1 | * | 5/2021 | Wang .................. G02B 6/2557 |
| 2021/0173146 | A1 | * | 6/2021 | Wang .................. G02B 6/2553 |
| 2021/0325623 | A1 | * | 10/2021 | Islam .................. G02B 6/2558 |
| 2021/0349263 | A1 | * | 11/2021 | Carlson ................ G02B 6/2558 |
| 2021/0356679 | A1 | * | 11/2021 | Dannoux ............. G02B 6/3879 |

* cited by examiner

FLEXIBLE SPLICE PROTECTOR ASSEMBLY AND METHOD FOR PREPARING SAME

RELATED APPLICATION

The present application claims priority from and the benefit of U.S. Provisional Patent Application No. 62/944,125, filed Dec. 5, 2019, the disclosure of which is hereby incorporated herein by reference in full.

FIELD OF THE INVENTION

The present invention relates generally to spliced cable and/or spliced optical fiber protectors.

BACKGROUND OF THE INVENTION

Optical fibers of fiber optic cables (either individual fibers or groups of fibers, such as ribbon fibers) are often spliced together to enable the transmission of signals between two cables. Fusion splicing is the process of fusing or welding two fibers together, usually by an electric arc. Fusion splicing is the most widely used method of splicing of optical fibers and fiber optic cables, as it typically provides for the lowest loss and least reflectance, as well as providing the strongest and most reliable joint between two fibers.

It may be desirable to provide techniques for enhancing fusion splicing operations, particularly in the field or in a warehouse.

SUMMARY OF THE INVENTION

As a first aspect, embodiments of the invention are directed to an assembly comprising: first and second fiber optic cables, each of the first and second fiber optic cables including an exposed portion of an optical fiber and an overlying jacket, wherein the optical fiber of the first fiber optic cable is fusion spliced to the optical fiber of the second fiber optic cable to form a splice area; a splice protector that surrounds the splice area of the first and second fiber optic cables; a flexible tube that encircles the splice protector, the exposed portions of the first and second fiber optic cables, and end portions of the jackets of the first and second fiber optic cables, wherein the splice protector, the exposed portions of optical fibers of the first and second fiber optic cables reside in a lumen of the flexible tube; first and second adhesive barriers positioned between an inner surface of the flexible tube and the end portions of the first and second fiber optic cables, respectively; and an outer sleeve that circumferentially overlies the flexible tube and portions of the jackets of the first and second fiber optic cables.

As a second aspect, embodiments of the invention are directed to an assembly comprising: first and second fiber optic cables, each of the first and second fiber optic cables including an exposed portion of an optical fiber and an overlying jacket, wherein the optical fiber of the first fiber optic cable is fusion spliced to the optical fiber of the second fiber optic cable to form a splice area; a splice protector that surrounds the splice area of the first and second fiber optic cables; a flexible corrugated tube that encircles the splice protector, the exposed portions of the first and second fiber optic cables, and end portions of the jackets of the first and second fiber optic cables, wherein the splice protector, the exposed portions of optical fibers of the first and second fiber optic cables reside in a lumen of the flexible tube; first and second adhesive barriers positioned between an inner surface of the flexible tube and the end portions of the first and second fiber optic cables, respectively; and an outer sleeve formed of a heat-shrinkable material that circumferentially overlies the flexible tube and portions of the jackets of the first and second fiber optic cables.

As a third aspect, embodiments of the invention are directed to an assembly comprising: first and second fiber optic cables, each of the first and second fiber optic cables including an exposed portion of an optical fiber and an overlying jacket, wherein the optical fiber of the first fiber optic cable is fusion spliced to the optical fiber of the second fiber optic cable to form a splice area; a splice protector that surrounds the splice area of the first and second fiber optic cables; a flexible tube that encircles the splice protector, the exposed portions of the first and second fiber optic cables, and end portions of the jackets of the first and second fiber optic cables, wherein the splice protector, the exposed portions of optical fibers of the first and second fiber optic cables reside in a lumen of the flexible tube; first and second adhesive barriers positioned between an inner surface of the flexible tube and the end portions of the first and second fiber optic cables, respectively; first and second dams attached to, respectively, the end portions of the jackets of the first and second fiber optic cables; and an outer sleeve formed of a heat-shrinkable material that circumferentially overlies the flexible tube and portions of the jackets of the first and second fiber optic cables.

DETAILED DESCRIPTION

Figure 1:
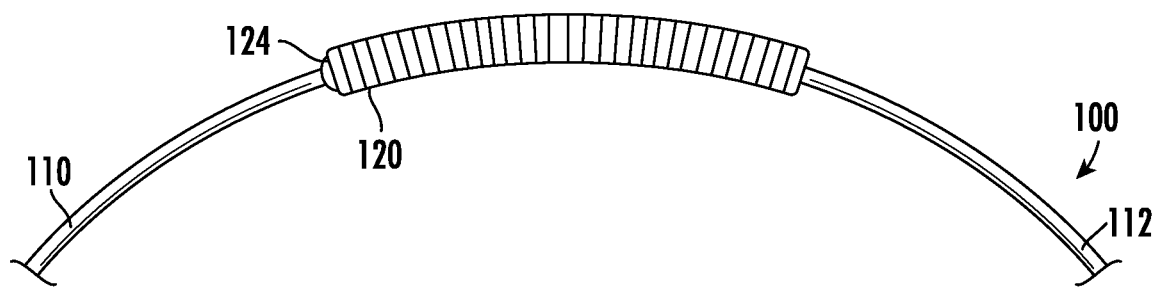
FIG. 1 is a top perspective view of a spliced fiber optic assembly according to embodiments of the invention, wherein the outer sleeve is omitted.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the figures, certain layers, components or features may be exaggerated for clarity, and broken lines illustrate optional features or operations unless specified otherwise. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. The sequence of operations (or steps) is not limited to the order presented in the claims or figures unless specifically indicated otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Figure 2:
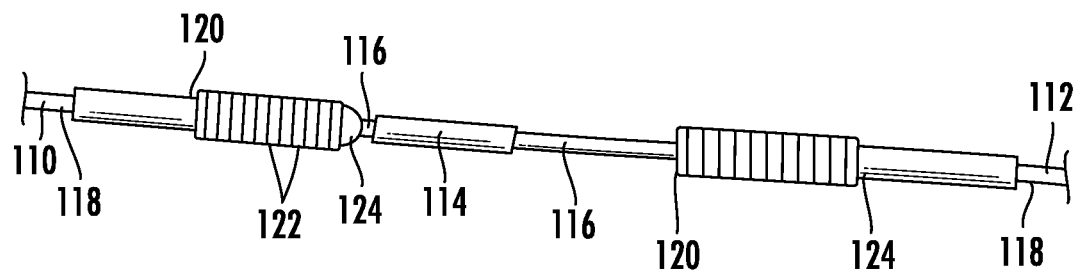
FIG. 2 is a top perspective view of the assembly of FIG. 1, wherein a portion of the tube has been cut away to illustrate the splice protector and the exposed fiber portions of the cables.
Figure 3:
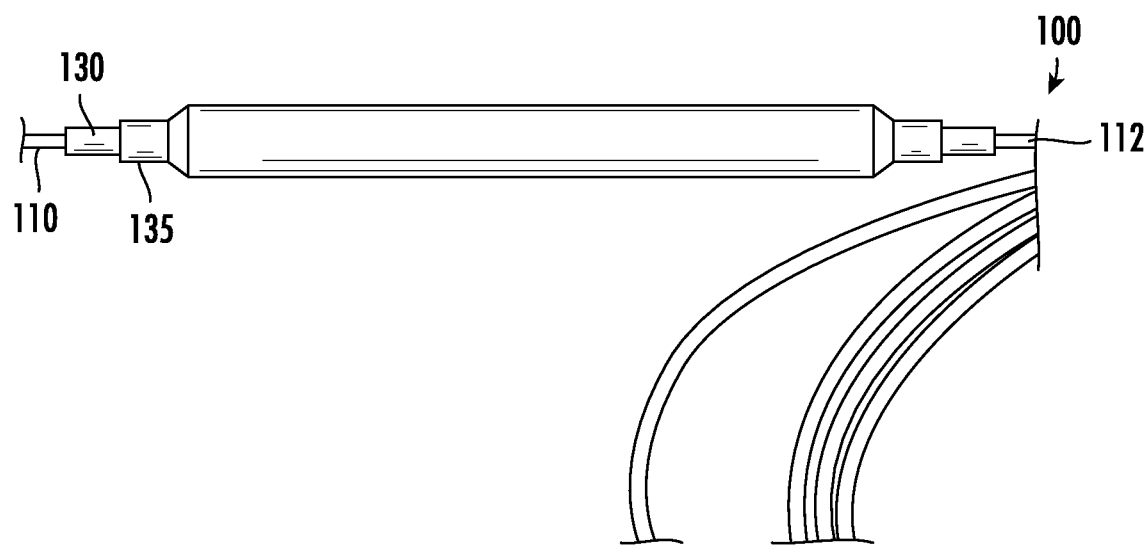
FIG. 3 is a top perspective view of the assembly of FIG. 1.

Referring now to the figures, an assembly, designated broadly at 100, is illustrated in FIGS. 1-3. The assembly 100 comprises two fiber optic cables 110, 112 that are fusion spliced, as evidenced by a splice protector 114 (see FIG. 2—although in some embodiments multiple splice protectors may be present). Exposed (and in some cases buffered) portions 116 of the fibers are present on either side of the splice protector 114. Each of the cables 110, 112 also includes a jacket 118.

As shown in FIG. 1 (and partially shown in FIG. 2), the assembly 100 includes a hollow, flexible tube 120. The flexible tube 120, which is typically formed of a flexible polymeric material such as nylon or PTFE, circumferentially surrounds the splice protector 114, the exposed portions 116, and the end portions of the jackets 118 of the fiber optics cables 110, 112. In the illustrated embodiment, the tube 120 includes corrugations 122, which can contribute to the flexibility (in both the axial and transverse directions) of the assembly 100. In some embodiments the tube 120 may be smooth, or may include a textured surface (e.g., an abraded surface).

The positioning of the exposed portions 116 of the fiber optic cables 110, 112 and the splice protector 114 within the lumen of the tube 120 can allow the exposed portions 116 and the splice protector 114 to "float" within the tube 120, and further allows for some bending of the fibers to occur in routing. The permitted float and bending can be beneficial due to the potential length and narrowness of the assembly 100. A flexible tube may be advantageous compared to a solid tube in that breakage is less of a concern (due to narrowness and length) and a flexible tube is easier to route inside enclosures. By permitting float of the splice protector 114 and the exposed portions 116, slight bends are of less concern because there is room for the fibers to adjust.

The assembly 100 also includes adhesive barriers 124 that underlie the ends of the tube 120. The adhesive barriers 124 (which are typically formed of a "non-sag" adhesive, i.e., one that tends to remain in place, rather than flowing, prior to curing) attach the tube 120 to the jacket 118, and also to any strength members (such as aramid yarns) that are present in the cables 110, 112. The adhesive barriers 124 lock the cables 110, 112 in place to prevent any fiber movement on either side of the assembly 110. The bond to the cable jacket 118 can prevent cable-to-tube rotation. The bonding onto the strength member(s) can provide the assembly 100 with pull strength. Moreover, if a corrugated tube 120 is employed, the corrugations 122 can enhance the pull strength compared to a smooth wall tube, as the adhesive of the adhesive barrier 124 fills the interior ridges between corrugations 122. In some instances the adhesive barriers 124 do not extend to the exposed portions 116 of the fibers, in which case the fibers are able to "float" relative to the jacket 118.

The adhesive may be dispensed via one or more fill holes in the tube 120; in a typical embodiment, the fill holes are typically positioned near the ends of the tube 120 (e.g., within 0.5 to 1 inch of the ends of the tube 120). Adhesive is injected through the fill holes such that the adhesive is forced to fill the space between the inner surface of the tube 120 and portions of the jacket 118 of the cables 110, 112. The adhesive is then permitted to cure in these locations to form the adhesive barriers 124. In some embodiments, any strength member that is present is exposed so that the adhesive can be directed into contact with it, thereby marrying the adhesive barrier 124 with the strength member.

In other instances, the adhesive may be injected directly into the lumen of the tube 120 through the open ends of the tube 120.

Referring now to FIG. 3, the assembly 100 further comprises an outer sleeve 130 that circumferentially overlies the tube 120 and portions of the cables 110, 112 adjacent the ends of the tube 120. The outer sleeve 130 may be formed of a heat-shrinkable material, a cold-shrinkable material, or some other suitable material. The sleeve 130 can provide pull strength, and can limit the bending of the assembly 100 (as it may provide greater rigidity than the tube 120). The outer sleeve 130 can act as a limiter to prevent highly flexible tubes 120 from bending too much and causing fiber kinks, particularly at the interface of the splice protector 114. The combination of tube 120 and outer sleeve 130 can provide a desirable balance of flexibility/rigidity for routing and protection, depending on the size and proposed location and use of the assembly 100.

In some embodiments, the outer sleeve 130 may be adhesive-backed (i.e., it may have adhesive on its inner surface. Many flexible tubes, such as the tube 120, can stretch considerably under load, particularly when corrugated. An adhesive-backed outer sleeve 130 can limit the allowable movement and elongation. (Although in some embodiments in which the tube 120 has corrugations, shrinking of the outer sleeve tube 130 into the corrugations may preclude the need for an adhesive-backed outer sleeve 130).

As is also shown in FIG. 3, the outer sleeve 130 may further be circumferentially surrounded by a second outer sleeve 135. The combination of two outer sleeves 130, 135 may provide a different balance of flexibility/rigidity, and may also provide additional strain relief. In some embodiments, both outer sleeves 130, 135 are heat-shrink sleeves.

Figure 4:
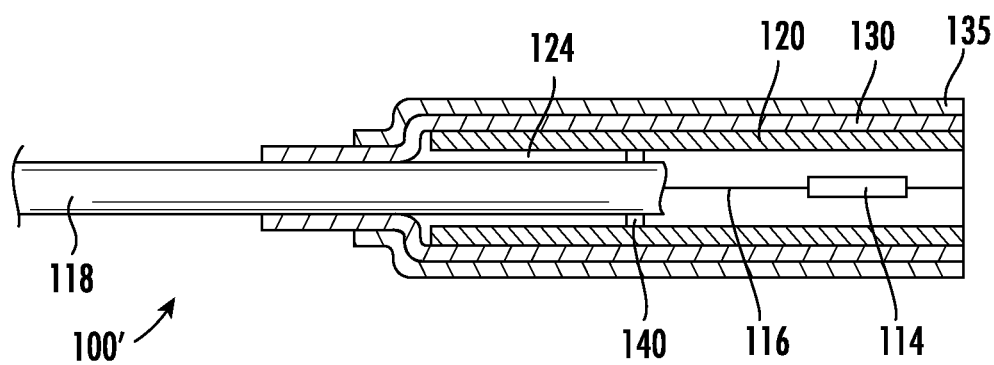
FIG. 4 is a partial top section view of an assembly according to alternative embodiments of the invention.

Referring now to FIG. 4, a portion of an alternative assembly 100' is shown therein. The assembly 100' is similar to the assembly 100, but includes dams 140 that encircle the jackets 118 of the cables 110, 112 at their ends (one dam 140 is shown in FIG. 4). In some embodiments, the dam 140 may comprise an O-ring attached to the end of the jacket 118. The dam 140 can block adhesive flow with no concern about overflow onto the fiber, as the dam 140 can block the flow and cause the adhesive instead to flow back out of the initial opening. In such instances, the fibers may be free to "float" relative to the jacket 118. In addition, the dam 140 can separate and isolate any strength member so it can be consistently bonded with the jacket 118 (normally the strength member resides with the fibers). The assembly 100' includes the tube 120 (shown in FIG. 4 as being smooth rather than corrugated), the outer sleeve 130, and the second outer sleeve 135 discussed above.

In some embodiments, the fusion-spliced assemblies 100, 100' can be relatively compact (compared, for example, with typical splice trays), such that much shorter lengths of fibers (e.g., a total spliced length between the two fibers of 3 to 6 inches) may be spliced.

Also, in some embodiments the adhesive barriers may be omitted, such that the outer sleeves(s) 130, 135 are sufficient to fix the assembly relative to the splice area.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. An assembly, comprising:
   first and second fiber optic cables, each of the first and second fiber optic cables including an exposed portion of an optical fiber and an overlying jacket, wherein the optical fiber of the first fiber optic cable is fusion spliced to the optical fiber of the second fiber optic cable to form a splice area;
   a splice protector that surrounds the splice area of the first and second fiber optic cables;
   a flexible tube that encircles the splice protector, the exposed portions of the first and second fiber optic cables, and end portions of the jackets of the first and second fiber optic cables;
   wherein the splice protector, the exposed portions of optical fibers of the first and second fiber optic cables reside in a lumen of the flexible tube;
   first and second adhesive barriers positioned between an inner surface of the flexible tube and the end portions of the first and second fiber optic cables, respectively; and
   an outer sleeve that circumferentially overlies the flexible tube and portions of the jackets of the first and second fiber optic cables.

2. The assembly defined in claim 1, wherein the flexible tube includes a plurality of corrugations.

3. The assembly defined in claim 1, wherein the outer sleeve comprises a heat-shrinkable material.

4. The assembly defined in claim 3, wherein the outer sleeve is adhesive-backed on an inner surface thereof.

5. The assembly defined in claim 1, wherein the outer sleeve is a first outer sleeve, and wherein a second outer sleeve circumferentially surrounds the first outer sleeve.

6. The assembly defined in claim 5, wherein both the first outer sleeve and the second outer sleeve comprise a heat-shrinkable material.

7. The assembly defined in claim 1, wherein the flexible tube comprises first and second fill holes in fluid communication with the first and second adhesive barriers.

8. The assembly defined in claim 1, wherein the adhesive barriers comprise a non-sag adhesive.

9. The assembly defined in claim 1, further comprising first and second dams attached to, respectively, the end portions of the jackets of the first and second fiber optic cables.

10. An assembly, comprising:
    first and second fiber optic cables, each of the first and second fiber optic cables including an exposed portion of an optical fiber and an overlying jacket, wherein the optical fiber of the first fiber optic cable is fusion spliced to the optical fiber of the second fiber optic cable to form a splice area;
    a splice protector that surrounds the splice area of the first and second fiber optic cables;
    a flexible corrugated tube that encircles the splice protector, the exposed portions of the first and second fiber optic cables, and end portions of the jackets of the first and second fiber optic cables;
    wherein the splice protector, the exposed portions of optical fibers of the first and second fiber optic cables reside in a lumen of the flexible tube;
    first and second adhesive barriers positioned between an inner surface of the flexible tube and the end portions of the first and second fiber optic cables, respectively; and
    an outer sleeve formed of a heat-shrinkable material that circumferentially overlies the flexible tube and portions of the jackets of the first and second fiber optic cables.

11. The assembly defined in claim 10, wherein the flexible tube comprises first and second fill holes in fluid communication with the first and second adhesive barriers.

12. The assembly defined in claim 10, wherein the adhesive barriers comprise a non-sag adhesive.

13. The assembly defined in claim 10, wherein the outer sleeve is a first outer sleeve, and wherein a second outer sleeve circumferentially surrounds the first outer sleeve.

14. The assembly defined in claim 13, wherein both the first outer sleeve and the second outer sleeve comprise wheat-shrinkable material.

15. The assembly defined in claim 10, further comprising first and second dams attached to, respectively, the end portions of the jackets of the first and second fiber optic cables.

16. An assembly, comprising:
    first and second fiber optic cables, each of the first and second fiber optic cables including an exposed portion of an optical fiber and an overlying jacket, wherein the optical fiber of the first fiber optic cable is fusion spliced to the optical fiber of the second fiber optic cable to form a splice area;
    a splice protector that surrounds the splice area of the first and second fiber optic cables;

a flexible tube that encircles the splice protector, the exposed portions of the first and second fiber optic cables, and end portions of the jackets of the first and second fiber optic cables;

wherein the splice protector, the exposed portions of optical fibers of the first and second fiber optic cables reside in a lumen of the flexible tube;

first and second adhesive barriers positioned between an inner surface of the flexible tube and the end portions of the first and second fiber optic cables, respectively;

first and second dams attached to, respectively, the end portions of the jackets of the first and second fiber optic cables; and an outer sleeve formed of a heat-shrinkable material that circumferentially overlies the flexible tube and portions of the jackets of the first and second fiber optic cables.

17. The assembly defined in claim 16, wherein the first and second dams comprise first and second O-rings.

18. The assembly defined in claim 16, wherein the outer sleeve is adhesive-backed on an inner surface thereof.

19. The assembly defined in claim 16, wherein the outer sleeve is a first outer sleeve, and wherein a second outer sleeve circumferentially surrounds the first outer sleeve, and wherein the second outer sleeve comprise a heat-shrinkable material.

20. The assembly defined in claim 16, wherein the flexible tube comprises first and second fill holes in fluid communication with the first and second adhesive barriers.

* * * * *